(12) United States Patent
Farahat

(10) Patent No.: US 9,721,308 B2
(45) Date of Patent: Aug. 1, 2017

(54) EVALUATING THE INFLUENCE OF OFFLINE ASSETS USING SOCIAL NETWORKING RESOURCES

(71) Applicant: Adobe Systems Incorporated, San Jose, CA (US)

(72) Inventor: Ayman Farahat, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 846 days.

(21) Appl. No.: 13/951,824

(22) Filed: Jul. 26, 2013

(65) Prior Publication Data

US 2015/0032510 A1 Jan. 29, 2015

(51) Int. Cl.
*G06Q 10/00* (2012.01)
*G06Q 30/00* (2012.01)
*G06Q 50/00* (2012.01)
*G06Q 30/02* (2012.01)

(52) U.S. Cl.
CPC ......... *G06Q 50/01* (2013.01); *G06Q 30/0205* (2013.01); *G06Q 30/0201* (2013.01)

(58) Field of Classification Search
CPC .................................................. G06Q 30/0201
USPC ....................................................... 705/7.29
See application file for complete search history.

(56) References Cited

U.S. PATENT DOCUMENTS

| | | | |
|---|---|---|---|
| 8,099,316 B2* | 1/2012 | Moukas | G06Q 10/0631 705/7.29 |
| 8,312,056 B1 | 11/2012 | Peng et al. | |
| 8,375,024 B2* | 2/2013 | Goeldi | G06Q 10/00 707/709 |
| 8,401,918 B2* | 3/2013 | Mesaros | G06Q 30/0222 705/26.1 |
| 2003/0033195 A1* | 2/2003 | Bruce | G06Q 30/02 705/7.31 |
| 2009/0063254 A1* | 3/2009 | Paul | G06Q 10/00 705/7.33 |
| 2010/0161376 A1* | 6/2010 | Spagnolo | G06Q 30/0205 705/7.34 |
| 2011/0231245 A1* | 9/2011 | Bhatia | G06Q 30/02 705/14.43 |
| 2012/0022937 A1* | 1/2012 | Bhatia | G06Q 30/0241 705/14.41 |
| 2012/0185544 A1* | 7/2012 | Chang | G06Q 50/01 709/206 |
| 2012/0278158 A1 | 11/2012 | Farahat | |

(Continued)

*Primary Examiner* — Sujay Koneru
(74) *Attorney, Agent, or Firm* — Finch & Maloney PLLC

(57) ABSTRACT

Techniques are disclosed for using social networking resources to evaluate the influence of offline marketing assets. In certain embodiments data posted to a social network is analyzed to identify references to a particular marketer and/or a particular brand. Where such reference is identified, geographic location data associated with the posted data is stored in a database. As this location data is aggregated over a period of time, it can be cross-referenced with location data corresponding to offline marketing assets that belong to the particular marketer and/or that are otherwise associated with the particular brand. Offline marketing assets that geographically correspond to a cluster of social networking activity can be understood as wielding influence within social networks and being capable of generating valuable word-of-mouth.

17 Claims, 5 Drawing Sheets

(56) References Cited

U.S. PATENT DOCUMENTS

| | | | |
|---|---|---|---|
| 2013/0091025 A1 | 4/2013 | Farahat et al. | |
| 2013/0173389 A1* | 7/2013 | Page | G06Q 30/02 705/14.58 |
| 2013/0325550 A1* | 12/2013 | Varghese | G06Q 30/02 705/7.31 |
| 2014/0040371 A1* | 2/2014 | Gurevich | H04L 61/609 709/204 |
| 2014/0144979 A1* | 5/2014 | Lyman | G06Q 30/0282 235/375 |

\* cited by examiner

EVALUATING THE INFLUENCE OF OFFLINE ASSETS USING SOCIAL NETWORKING RESOURCES

FIELD OF THE DISCLOSURE

This application relates generally to the field of marketing research, and more specifically, to techniques for using social networking resources to evaluate the influence of offline assets.

BACKGROUND

One of the fundamental challenges that a business faces is the ongoing need to attract new customers and retain existing customers. The field of marketing has grown to address this challenge, the result of which has been the development of a wide variety of market research methods that can be used to define and evaluate the efficacy of a marketing campaign. These market research methods may include techniques such as use of surveys to evaluate consumer sentiment and advertisement tracking used to evaluate consumer response to a particular campaign. For instance, a print advertisement containing a telephone number may also include an "extension" that any caller will be asked for; such an extension may be correlated with the particular location where the print advertisement was published. As another example, customers may be asked where they heard about an offer or a website as part of the checkout process. Techniques such as these may allow marketers to improve their marketing campaigns and therefore more effectively attract and retain customers.

DETAILED DESCRIPTION

Figure 1:
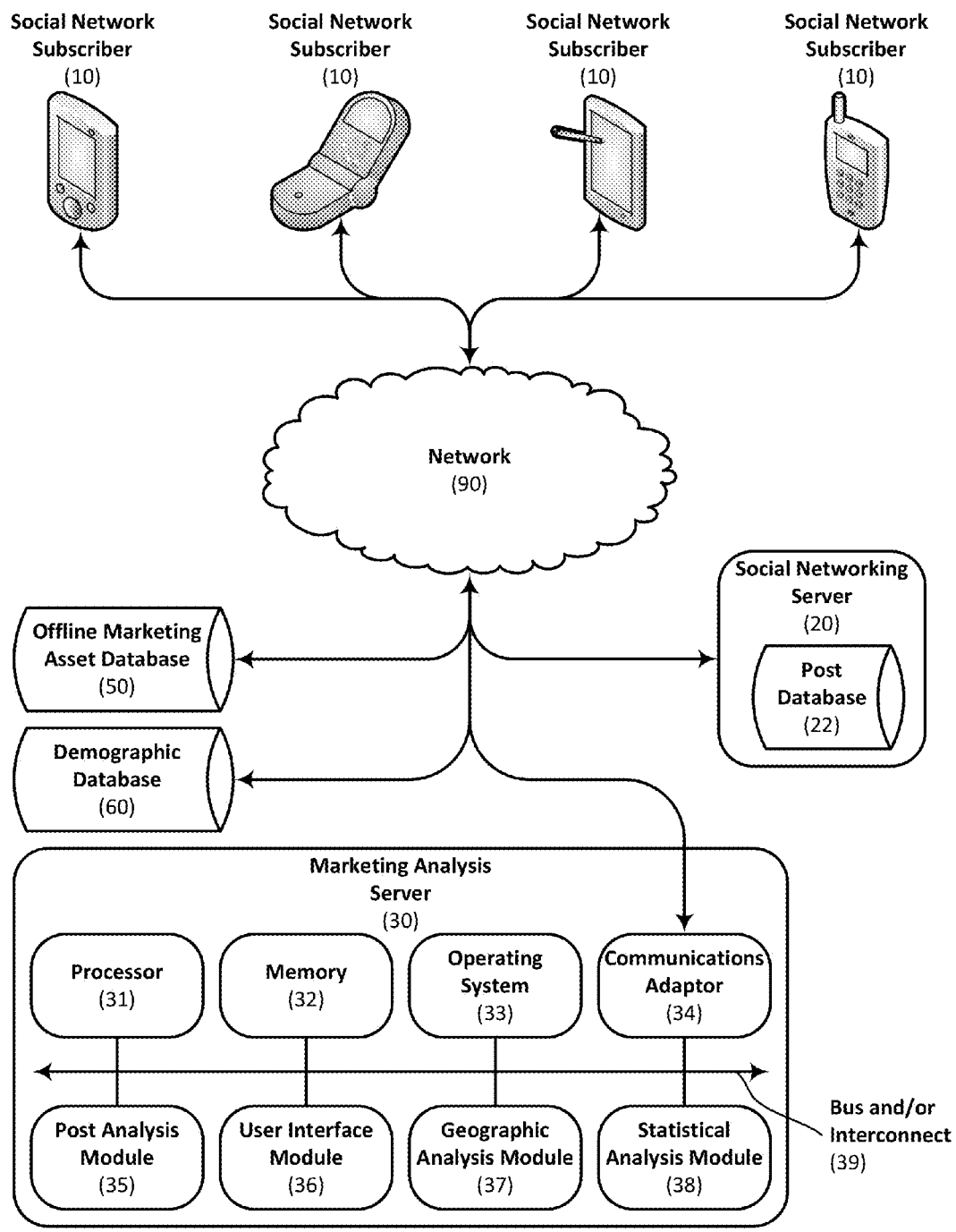
FIG. 1 is block diagram schematically illustrating selected components of a system for evaluating the influence of offline assets using social networking resources in accordance with an embodiment of the present invention.

Techniques are disclosed for using social networking resources to evaluate the influence of offline marketing assets. In certain embodiments data posted to a social network is analyzed to identify references to a particular marketer and/or a particular brand. Where such reference is identified, geographic location data associated with the posted data, if available, is stored in a database. As this location data is aggregated over a period of time, it can be cross-referenced with location data corresponding to offline marketing assets that belong to the particular marketer and/or that are otherwise associated with the particular brand. Examples of such offline marketing assets include billboards, print media campaigns, outdoor marketing activities and brick-and-mortar retail establishments. Offline marketing assets that geographically correspond to a cluster of social networking activity can be understood as wielding influence within social networks and being capable of generating valuable word-of-mouth. In certain embodiments social network activity within a target area containing an offline marketing asset is compared with social network activity within a corresponding control area that does not include offline marketing assets. Such a comparison provides insight into the marginal capacity of the offline marketing asset to generate word-of-mouth associated with the marketer or brand under evaluation. Numerous configurations and variations of the offline asset evaluation techniques disclosed herein will be apparent in light of this disclosure.

General Overview

A wide variety of market research methods have been developed to help marketers define and evaluate various aspects of their marketing campaigns. These market research methods include, for example, surveys used to evaluate consumer sentiment and advertisement tracking used to evaluate consumer response to a particular campaign. Such methods tend to have high administration costs and tend to produce data with limited accuracy. For example, there can be substantial costs associated with the proper administration of consumer surveys, and even when such surveys are conducted according to established norms, the accuracy of the resulting data depends largely on obtaining a statistically significant sample of consumers who take the time to provide thoughtful and sincere responses to the survey questions. Surveys conducted on an informal basis may have lower administrative costs, but are also less likely to produce statistically reliable results. Furthermore, surveys and tracking techniques both tend to be fairly narrowly tailored in scope, and are often focused on a particular campaign or target demographic; as a consequence, the conclusions which may be drawn from the resulting data may be similarly limited.

Moreover, conventional market research methodologies are not well-suited to evaluate word-of-mouth, which is one of the oldest and most effective marketing techniques. As used herein, the term "word-of-mouth" refers, in addition to its ordinary meaning, to informal communications amongst customers and potential customers of a business, as contrasted with communications which are generated or otherwise sponsored by the business itself. Word-of-mouth is also sometimes referred to as "buzz", particularly in the context of online communications. Among other things, word-of-mouth can be generated when consumers see or otherwise react to both online marketing assets (such as a promotional webpage, a banner advertisement or an online video) and offline marketing assets (such as a billboard, a television advertisement or a retail establishment). For example, word-of-mouth can be generated by a consumer mentioning to a friend a positive shopping experience or an amusing advertisement seen on television. Positive word-of-mouth is generally recognized as one of the most credible forms of advertising because people who have little or nothing to gain by promoting something put their reputations at stake when they make a recommendation. However, despite its importance to marketers, and largely due to its inherently informal nature, word-of-mouth remains particularly difficult for marketers to evaluate and foster. In particular, one of the most challenging issues that marketers face is identifying the factors that impact word-of-mouth and quantifying such impact.

Thus, and in accordance with an embodiment of the present invention, techniques are provided herein for using social networking resources to evaluate the influence of offline marketing assets, and in particular, to evaluate the extent to which such assets generate word-of-mouth. For example, certain of the techniques disclosed herein involve an initial process of monitoring social networks for postings that (a) mention a particular marketer and/or brand of interest, and (b) include location information. The particular marketer and/or brand of interest are collectively referred to herein as the "evaluated entity"; it will be appreciated that in certain embodiments the evaluated entity comprises a single marketer, brand or other entity, while in other embodiments the evaluated entity may comprise multiple marketers, brands and/or entities. As used herein, the term "marketer" refers, in addition to its ordinary meaning, to a person or establishment that seeks to convey a message to an audience. The identified location information can be cross-referenced with location data of offline marketing assets that belong to or that are otherwise associated with the evaluated entity. Offline marketing assets that geographically correspond to a cluster of social networking activity can be inferred as wielding influence within social networks, as therefore, as being a source of word-of-mouth. As part of this analysis, social network activity within a target area containing an offline marketing asset can be compared with social network activity within a corresponding control area that does not include, or is not otherwise significantly influenced by, offline marketing assets. The results of such a comparison provide an indication of how much word-of-mouth the offline marketing asset is capable of generating, if any.

A social network is a particularly useful tool for evaluating how offline marketing assets contribute to word-of-mouth. As used herein, the term "social network" refers, in addition to its ordinary meaning, to an online platform that can be used to establish connections between people who, for example, share interests, backgrounds or real-life connections. Social networks often comprise, for each member, a profile, links with other members and applications, applets and/or other functionality that facilitates interaction among members. Social networks also often include a trust-based recommendation system, thereby allowing members to recommend resources or connections to other members with whom a trusted connection is already shared. One example of an online social networking service is Facebook (Menlo Park, Calif.), which allows members to create a personal profile, add other members as "friends", exchange messages, and "like" things that they see while using the service. Similar services are provided by Google+ (Mountain View, Calif.). Another example of a slightly different type of online social networking service is Twitter (San Francisco, Calif.), which allows members to send and read text-based messages of up to 140 characters. Such messages, known as "tweets", can be shared with other members publicly, or alternatively, with only select "followers". As a result, Twitter is also sometimes referred to as a "micro-blogging" service.

Many social networking services, including the aforementioned Facebook, Google+ and Twitter, feature user interfaces that are specifically configured for use with portable computing devices, such as mobile phones, smartphones and tablet computers. Portable devices such as these often include means for establishing the geographic location of the device at any given time, such as via a global positioning system (GPS) receiver or network localization functionality. As a result, user interactions with mobile embodiments of services such as Facebook, Google+ and Twitter often provide geographic location information, also sometimes referred to as "geotag data". Thus, for example, a tweet may contain not only a textual message, but location data indicating the geographic location of the sender was when the message was sent. Likewise, a photograph posted to Facebook or Google+ may also contain geotag data indicating the location where the photograph was taken and/or posted. The automated generation of this location information means that social networks provide a large stream of word-of-mouth data that can be readily quantified geographically. Thus, certain of the embodiments disclosed herein are particularly well-suited for implementation using social networking data generated by a mobile-native service such as Twitter since a considerable portion of tweets are sent from mobile devices capable of generating geotag data.

Analyzing data contained within the tweets generated by Twitter users, for example, can provide insight with respect to the extent to which offline marketing asserts are capable of generating word-of-mouth. In one embodiment, the number of tweets mentioning a particular marketer within a certain predefined proximity of the market's offline asset—such as a retail location—can be quantified and compared to the number of tweets mentioning the particular marketer within a similar area that does not contain the offline asset. The difference in these quantifications provides an estimate of the causal impact of the retail location in driving word-of-mouth. Postings associated with social networking services also typically include temporal information indicating the time at which a particular posting is made, and such "temporal tag data" can further be used to evaluate word-of-mouth, especially with respect to offline marketing assets which are intermittent or which have a well-defined implementation date or time. For example, in the case of a television or radio advertisement, social network activity occurring immediately before and immediately after the advertisement is broadcast can be analyzed to provide insight with respect to the word-of-mouth generated by the advertisement. Different advertisements can be compared to determine their relative efficacy in driving word-of-mouth. Thus it will be appreciated that the present invention is not intended to be limited to analysis of geotag data provided via a social network, but may encompass analysis of any other appropriate data distributed using social networking resources.

Certain of the embodiments disclosed herein help marketers evaluate how word-of-mouth changes in response to implementation or modification of a marketing strategy. For example, a marketer might decide to implement an outdoor advertising campaign in a certain area through the use of billboards, direct mail, and pamphlet distribution. Once such a campaign is underway, the marketer can compare the word-of-mouth within the targeted region with (a) word-of-mouth in a demographically similar area outside the geographical area of the campaign and/or (b) word-of-mouth in the same geographical area before the campaign was implemented. Word-of-mouth can be evaluated based on the frequency at which the subject of the campaign in mentioned in social networking postings as described herein. A statistically significant difference in social networking activity will correspond to an estimate of the marginal contribution of the offline asset to word-of-mouth. Such techniques can also be used to evaluate the word-of-mouth value of other assets, such as a bricks-and-mortar storefront. Being able to estimate the word-of-mouth impact of a retail outlet before actually establishing the outlet is particularly useful since there are large costs associated with opening and closing stores, thereby making experimentation in this regard prohibitively expensive.

The results of the social network data analysis described herein can be provided in a variety of different formats. For example, such results can be provided via (a) a listing of the various rates at which a marketer and/or a brand is mentioned in regions corresponding to various offline marketing assets, (b) a listing of the various rates at which a marketer and/or a brand is mentioned at times before and after various offline marketing events, and/or (c) geographical map with different symbols indicating the locations of offline marketing assets and social networking activity. Other user interface methodologies can be used in other embodiments, and it will be appreciated that the present invention is not intended to be limited to any particular format for presenting the generated data. In certain embodiments the systems disclosed herein can be hosted on a given website and implemented, for example, using JavaScript or another suitable browser-based technology, thereby further facilitating presentation and distribution of results in a networked computing environment.

Thus, in one implementation a consumer near a department store and sees an attractive pantsuit on display. The consumer wishes to share the pantsuit with her friends, so she accesses her Twitter account and sends a tweet that contains the name of the department store and a link to a photograph of the pantsuit. In a way that is transparent to the consumer and her Twitter followers, this tweet is detected as containing both a reference to the department store (based on the inclusion of the store name in the tweet) and geotag information indicating the location from where the tweet was sent. As a result of activity such as this, extended across all the consumers who happen upon the department store and mention it in a Twitter posting, it can be expected that there will be a higher concentration of tweets containing the name of the department store that are sent from with a certain proximity of the store. This marginally higher percentage of tweets can be understood as corresponding to the marginal impact the department store has on word-of-mouth. Data indicating tweet patterns in the geographical region around the department store can be presented to a marketer working for the store, thereby allowing the marketer to better understand how the presence of the store affects word-of-mouth. Such data can be presented in tabular format, in geographical format (such as by plotting relevant tweet locations on a map), or using any other appropriate presentation format.

System Architecture

FIG. 1 is a block diagram schematically illustrating selected components of a system that can be used to evaluate the influence of offline assets using social networking resources. This evaluation results from a sequence of interactions between one or more social network subscribers 10, a social networking server 20, and a marketing analysis server 30. In certain embodiments social network subscribers 10 use a computing device, such as a portable computing device, to interact with social networking server 20. Examples of such portable computing devices include handheld computers, cellular telephones, tablet computers and smartphones. Other devices can be used in other embodiments, including devices with less portability, such as set-top boxes, laptop computers and desktop computers. In certain embodiments one or more of the portable computing devices include hardware and/or software capable of estimating the geographic location of the device. Such functionality may be provided, for example by an integrated GPS receiver and/or by software capable of estimating location based on wireless signal strength evaluation and/or triangulation techniques.

Social networking server 20 is configured to manage the transmission of data and services to, and the reception of data and resource requests from, social network subscribers 10. In certain embodiments social networking server 20 provides services such as those typically associated with popular social networking services such as the aforementioned Facebook, Google+ and Twitter services. For example, in an embodiment wherein social networking server 20 provides text messaging subscription services such as those provided by Twitter, social network subscribers 10 may send and receive text messages through social networking server 20. Social network postings and other activities received from social network subscribers 10 can be stored in a post database 22 hosted by social networking server 20; examples of such postings include instant and/or text messages sent to other members of the social network, blog postings, public postings, broadcast messages and the like. While a single social networking server 20 is illustrated in the example embodiment of FIG. 1, it will be appreciated that in other embodiments the equivalent services may be provided by a distributed network of hundreds or even thousands of social networking servers, thereby increasing system capacity and stability.

Figure 2:
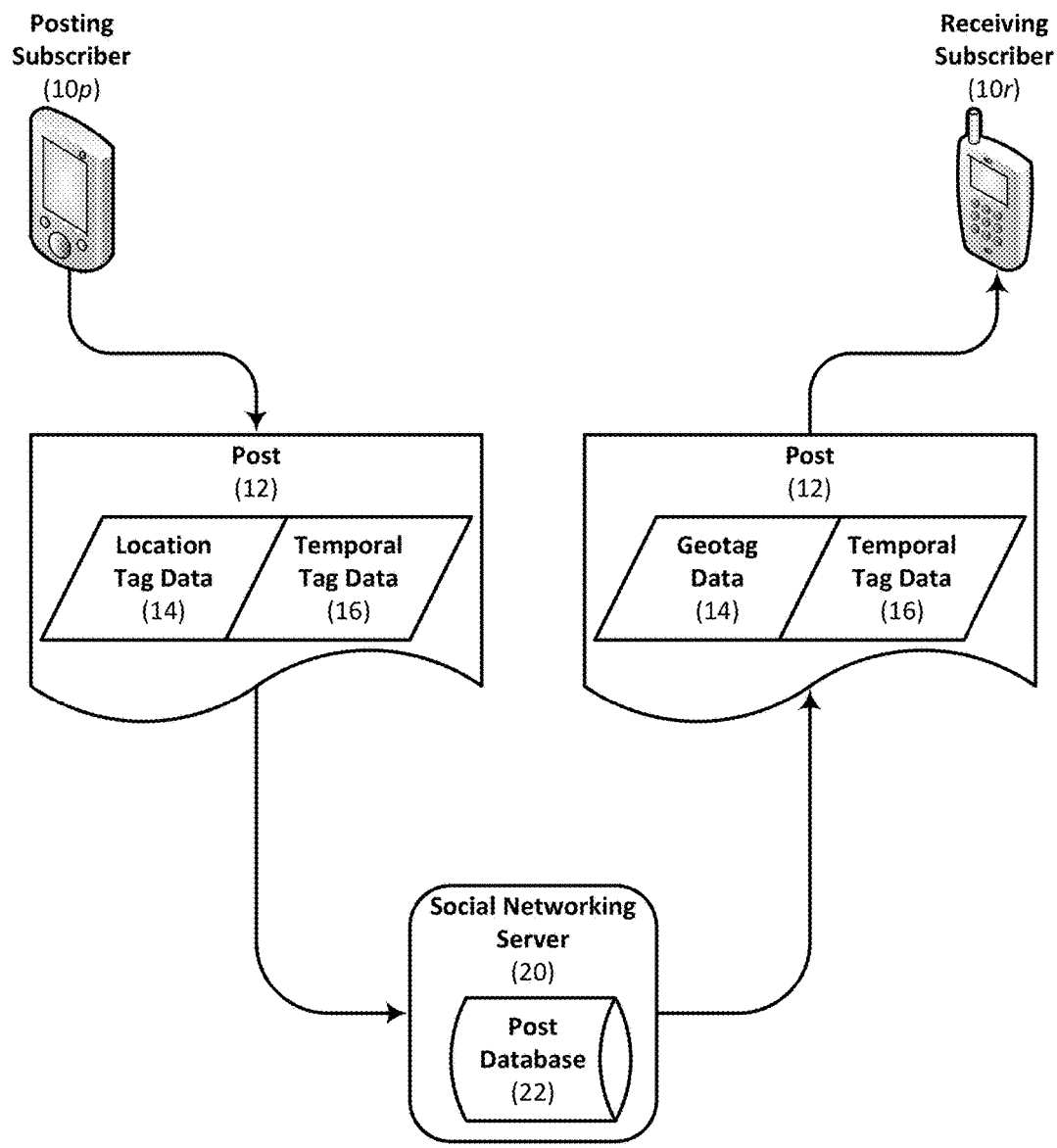
FIG. 2 is a data flow diagram schematically illustrating how a social networking post can be passed from a posting subscriber to a receiving subscriber via a social networking server in accordance with an embodiment of the present invention.

FIG. 2 is a data flow diagram schematically illustrating how a social networking post 12 can be passed from a posting subscriber 10p to a receiving subscriber 10r via social networking server 20. Post 12 optionally includes supplemental data such as location tag data 14 and/or temporal tag data 16 which provide information with respect to where and when, respectively, post 12 originated. While FIG. 2 illustrates that post 12 is distributed to a single social network receive subscriber 12r, it will be appreciated that in other embodiments posts can be distributed to any suitable number of recipients, such as in the case of a Twitter subscriber broadcasting a tweet to his or her followers. In certain embodiments a copy of post 12, including location tag data 14 and temporal tag data 16, is saved in post database 22 hosted by server 20. This advantageously allows such data to be subsequently retrieved for further analysis as disclosed herein. In alternative embodiments social networking server can be configured to automatically forward some or all of the processed posts to marketing analysis server 30.

Referring again to the example embodiment illustrated in FIG. 1, marketing analysis server 30 includes one or more modules configured to implement certain of the functionalities disclosed herein, as well as hardware configured to enable such implementation. In such embodiments, this hardware may include, but is not limited to a processor 31, a memory 32, an operating system 33 and a communications adaptor 34. Processor 31 can be any suitable processor, and may include one or more coprocessors or controllers, such as an audio processor or a graphics processing unit, to assist in processing operations of marketing analysis server 30. Memory 32 can be implemented using any suitable type of digital storage, such as one or more of a disk drive, a universal serial bus (USB) drive, flash memory and/or random access memory. Operating system 33 may comprise any suitable operating system, such as Google Android, Microsoft Windows or Apple OS X. As will be appreciated in light of this disclosure, the techniques provided herein can be implemented without regard to the particular operating system provided on marketing analysis server 30, and therefore may also be implemented using any suitable existing or subsequently-developed platform.

Communications adaptor 34 can be any suitable network chip or chipset which allows for wired and/or wireless communication to network 90, thereby enabling marketing analysis server 30 to communicate with social network subscribers 10, social networking server 20, and/or other networked resources as disclosed herein. Network 90 may be a local area network (such as a home-based or office network), a wide area network (such as the Internet), or a combination of such networks, whether public, private or both. In some cases access to resources on a given network or computing system may require credentials such as usernames, passwords, and/or any other suitable security mechanism. A bus and/or interconnect 39 may also be provided to allow for inter- and intra-device communications using, for example, communications adaptor 34 and/or network 90.

As described herein, in certain embodiments marketing analysis server 30 includes one or more modules configured to implement certain of the functionalities disclosed herein. For example, in one embodiment marketing analysis server 30 includes a post analysis module 35 configured to analyze social network data transmitted from social network subscribers 10 to social networking server 20 and identify references to a particular evaluated asset. Social network data includes "social network postings", which refers generally to data sent from one or more of social network subscribers 10 to social networking server 20 for use in conjunction with a social networking service. Examples of social network postings include Twitter tweets, Facebook status updates and other similar user-generated content. Social network postings may also include data associated with social networking activity, such as (a) "check-in" or similar data indicating that a particular user is physically present at a particular location (for example, at a retail establishment or shopping mall), and (b) "like", "+1" or similar data indicating that a particular user has clicked on a link indicating a positive disposition toward something that he/she has seen while using a particular social networking service. In certain embodiments social network postings may be automatically or semi-automatically generated based on a script, applet or other control feature. Post analysis module 35 may identify references to a particular evaluated asset by a wide variety of techniques, including text string searching, hash tag identification and hyperlink analysis. For instance, in some embodiments post analysis module 35 may be configured to detect hyperlinks associated with a particular domain, such that any social network postings containing hyperlinks to a location hosted by that domain are identified. As another example, post analysis module 35 may additionally or alternatively be configured to detect user-generated hash tags that indicate the subject or sentiment associated with detected social networking activity. Post analysis module 35 is optionally configured to identify social network postings meeting other criteria, such as the inclusion of location tag data and/or the inclusion of temporal tag data. An aggregation of references identified by post analysis module identified as being relevant to the marketing asset under evaluation may be saved in a database managed by marketing analysis server 30; such an aggregation also optionally includes geotag data associated with the potentially relevant references.

Still referring to the example embodiment illustrated in FIG. 1, marketing analysis server 30 also includes a user interface module 36 configured to provide a user with access to the functionality associated with marketing analysis server 30. For example, in certain embodiments user interface module 36 can be configured to receive input from a user with respect to marketers, brands, offline assets, geographical regions and/or time periods which are to be the subject of market research analysis. User interface module 36 is also optionally configured to display messages and analytical results based on the operation of marketing analysis server 30. Such analytical results may be provided in the form of data presented in tabular or graphical formats, including geographic data presented in conjunction with a map or other diagram. Thus, for example, in certain embodiments user interface module 36 may be configured to leverage the resources provided by a mapping application that can be used to plot locations on a custom-defined map. In other embodiments, analytical results may be provided in the form of a data file or other computer-readable data structure capable of being shared with other users and/or computing resources.

In certain embodiments marketing analysis server 30 also includes a geographic analysis module 37 that is configured to define geographic target and control regions corresponding to an offline marketing asset identified by a user. The geographic target region is a geographic region associated with an offline marketing asset. Examples of such regions may include a certain radius around a particular retail outlet, a shopping mall where a particular retail outlet is located, a city where display advertising has been purchased on the municipal mass transit system, a broadcast area associated with a radio station where broadcast advertising has been purchased, or an intersection where a billboard has been erected. The geographic control region is a geographic region similar to the geographic target region, but that does not contain the offline marketing asset that is being evaluated. Examples of such regions may include a shopping mall where in the same town that does not include the particular retail outlet, a city with similar demographics where display advertising or broadcast advertising has not been purchased, or nearby intersection where no billboards are present. In certain embodiments the geographic control region corresponds directly to the geographic target region, but social networking activity is analyzed within this common region during different time periods, such as before and after a particular offline media asset is put in place or otherwise implemented.

The geographic target and control regions may be defined based on one or more of a variety of different factors, including based on a user-supplied definition provided by user interface module 36. For instance, the geographic target region may be defined based on the user's identification of a particular offline marketing asset, such as a particular billboard or retail establishment. In this case geographic analysis module 37 may optionally define the geographic target region by leveraging the resources of a networked offline marketing asset database 50 containing location information associated with such assets. As another example, the geographic target region may be defined based on the user's identification of a particular radio station where broadcast advertising has been purchased; in such case geographic analysis module 37 may optionally define the geographic target region by leveraging the resources of database 50 containing broadcast region information associated with the selected radio station.

In other embodiments geographic analysis module 37 is optionally configured to identify demographic characteristics of the geographic target region and define a geographic control region that has similar demographic characteristics but that does not include the offline media asset under evaluation. This can be accomplished, for example, by leveraging the resources of a networked demographic database 60 containing geographically keyed demographic information. For example, where the geographic target region is identified as having a particular demographic profile, geographic analysis module 37 can be configured to search for a corresponding geographic control region having a similar demographic profile. The demographic profile can be defined by one or more of a wide variety of demographic factors, such as median household income, average age, population density, social networking service membership rates, and the like. Identifying target and control regions having similar demographic characteristics advantageously facilitates comparisons in social networking word-of-mouth observations made in the two regions.

Still referring to the example embodiment illustrated in FIG. 1, marketing analysis server also includes a statistical analysis module 38 configured to quantify and compare social networking activity identified as occurring within the geographic target and control regions. In certain embodiments such quantification may comprise determining a proportion of social network postings that mention a particular evaluated asset. Such a proportion is sometimes referred to as a "mention rate". This quantification may be based on, for example, social networking references identified as being relevant by post analysis module 35, as described herein. For example, a retailer may discover that 0.26% of tweets sent from a shopping mall where the retailer has a physical presence contain some reference to the retailer and/or one of the retailer's brands. Further analysis may reveal that only 0.12% of tweets sent from the town where the shopping mall is located, excluding tweets sent from the shopping mall itself, contain such reference. This allows the retailer to quantify the word-of-mouth effect of the retailer's physical presence at the shopping mall. A similar analysis may be applied to other offline marketing assets, such as broadcast advertising, display advertising, door-to-door campaigns, and the like. Furthermore, while certain embodiments are described as providing a comparison between a target region containing an offline marketing asset and a control region that does not, in other embodiments similar techniques can be used to provide other comparisons. For example, in a modified embodiment certain of the methodologies disclosed herein can be used to provide a comparison between the word-of-mouth generation capacity of a retail outlet in two different cities.

In certain embodiments statistical analysis module 38 is configured to perform a test of proportion to determine whether differences in detected mention rates are due to random fluctuations. One example of a test of proportion is a log likelihood ratio test, which can be used to determine a likelihood ratio. Such a ratio expresses how much more likely a null hypothesis is correct as opposed to an alternative hypothesis. In this case, the null hypothesis can be defined as the situation where differences in a detected mention rate are due to random fluctuations, while the alternative hypothesis is that such differences are statistically significant. Thus the likelihood ratio provides an indication of how likely it is that an observed difference in mention rate is due to a statistically significant variance, as optionally to random variance. Performing a log likelihood ratio test to evaluate the likelihood ratio with respect to, for example, mention rates determined for certain test and control regions provides a way to detect how random fluctuations may have affected the determined mention rates.

The various embodiments disclosed herein can be implemented in various forms of hardware, software, firmware and/or special purpose processors. For example in one embodiment a non-transitory computer readable medium has instructions encoded thereon that, when executed by one or more processors, cause one or more of the offline asset evaluation methodologies disclosed herein to be implemented. The instructions can be encoded using any suitable programming language, such as C, C++, object-oriented C, JavaScript or BASIC, or alternatively, using custom or proprietary instructions sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. The functionalities disclosed herein can optionally be incorporated into other software applications, such as campaign management applications, or can optionally leverage services provided by other software applications, such as mapping applications. The computer software applications disclosed herein may include a number of different modules, sub-modules or other components of distinct functionality, and can provide information to, or receive information from, still other components and/or services. These modules can be used, for example, to communicate with input and/or output devices such as a display screen, a touch sensitive surface, a printer and/or any other suitable input/output device. Other components and functionality not reflected in the illustrations will be apparent in light of this disclosure, and it will be appreciated that the claimed invention is not intended to be limited to any particular hardware or software configuration. Thus in other embodiments marketing analysis server 30 may comprise additional, fewer or alternative subcomponents as compared to those included in the example embodiment illustrated in FIG. 1.

The aforementioned non-transitory computer readable medium may be any suitable medium for storing digital information, such as a hard drive, a server, a flash memory and/or random access memory. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software and firmware can be used, and that the present invention is not intended to be limited to any particular system architecture.

Methodology

Figure 3:
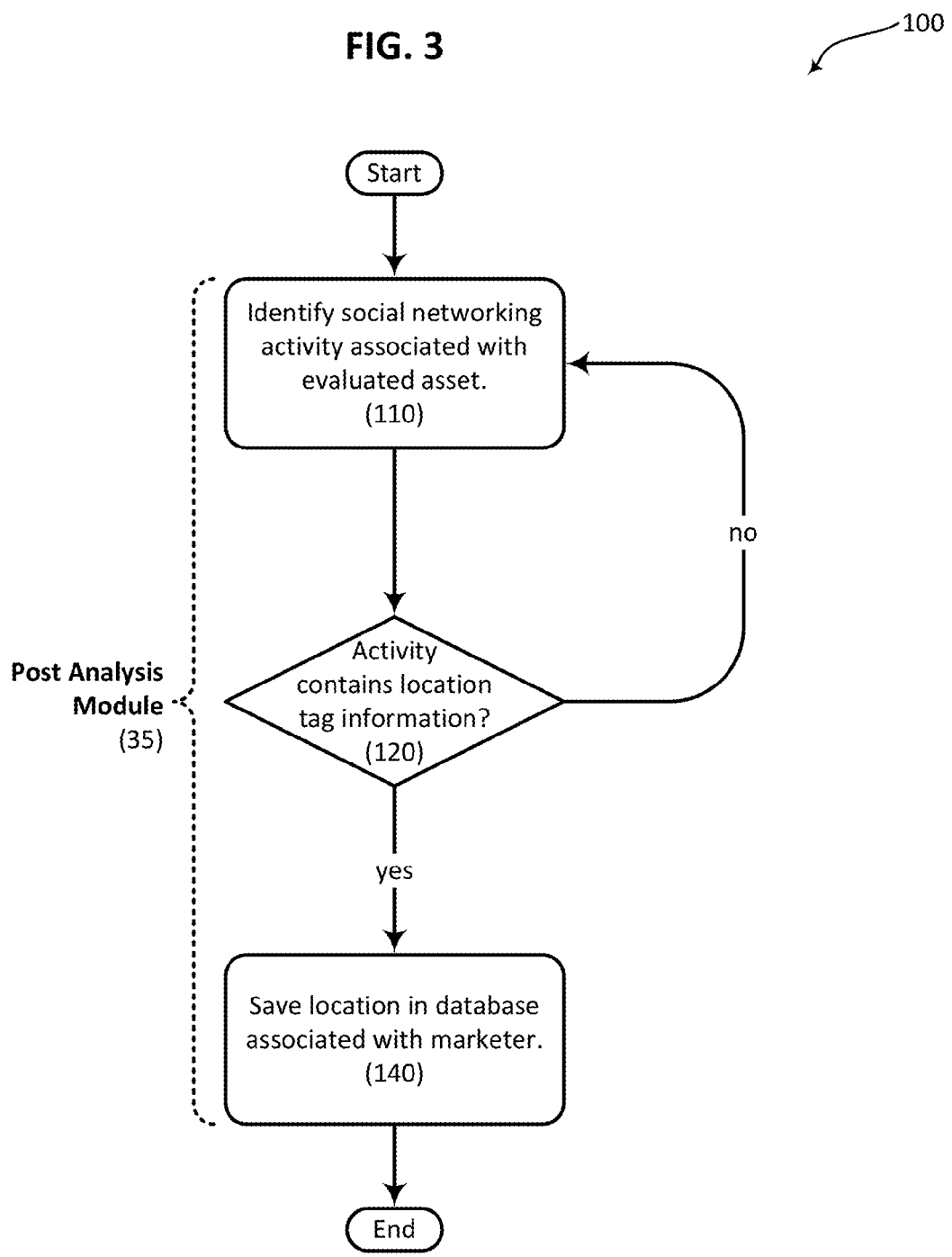
FIG. 3 is a flowchart illustrating an example methodology that can be used in certain embodiments of the present invention to aggregate social networking data associated with a particular marketer and/or brand.
Figure 4:
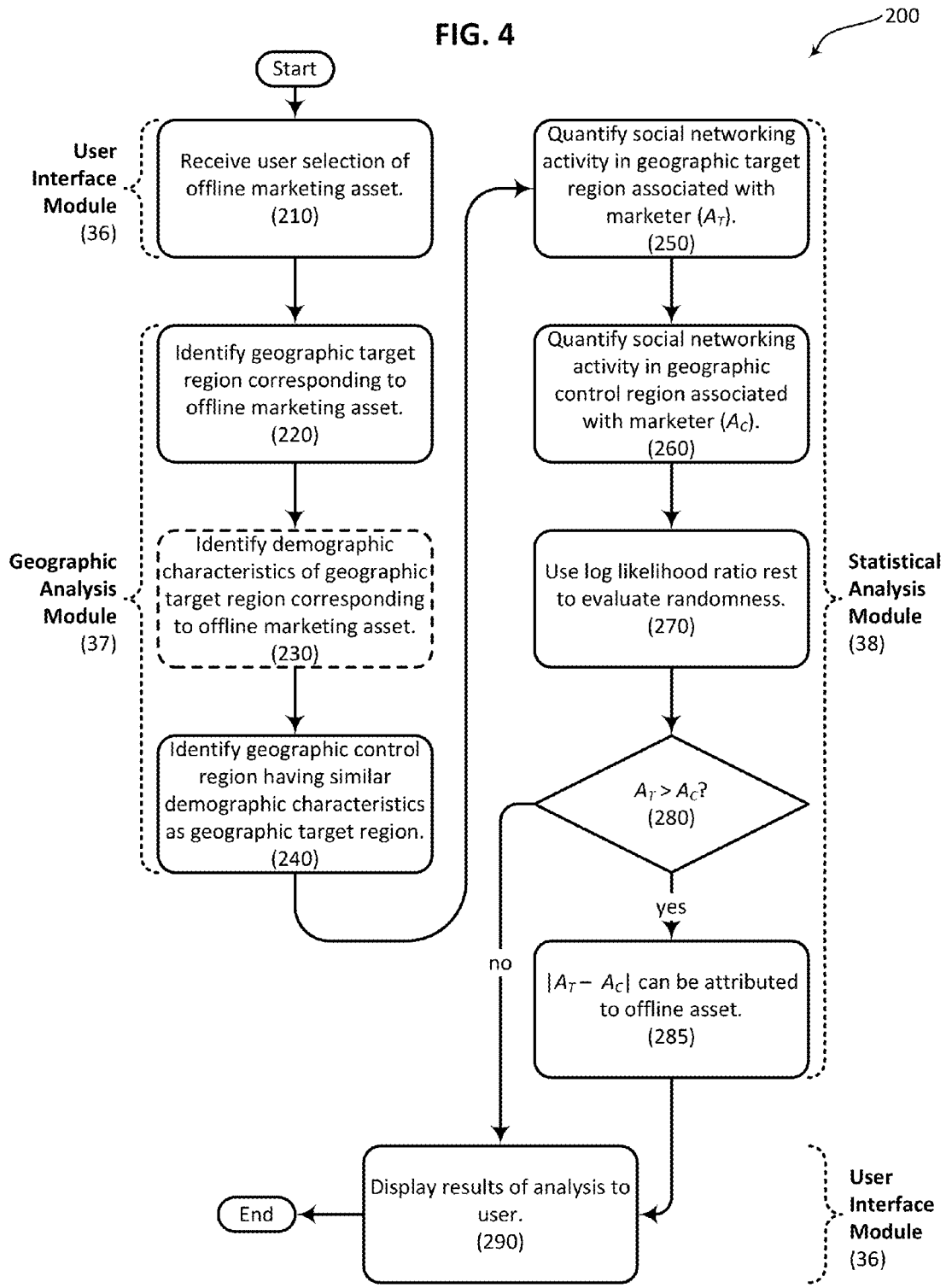
FIG. 4 is a flowchart illustrating an example methodology that can be used in certain embodiments of the present invention to evaluate the influence of offline assets using aggregated social networking data.

FIG. 3 is a flowchart illustrating an example methodology that can be used in certain embodiments to aggregate social networking data associated with a particular marketer and/or brand. FIG. 4 is a flowchart illustrating an example methodology that can be used in certain embodiments to evaluate the influence of offline assets using aggregated social networking data. As can be seen these example methodologies include a number of phases and sub-processes, the sequence of which may vary from one embodiment to another. However, when considered in the aggregate, these phases and sub-processes form a complete offline asset evaluation process that is responsive to user commands in accordance with certain of the embodiments disclosed herein. These methodologies can be implemented, for example, using the system architecture illustrated in FIG. 1 as described herein.

However other system architectures can be used in other embodiments, as will be apparent in light of this disclosure. To this end, the correlation of the various functions shown in FIGS. 3 and 4 to the specific components illustrated in FIG. 1 is not intended to imply any structural and/or use limitations. Rather, other embodiments may include, for example, varying degrees of integration wherein multiple functionalities are effectively performed by one system. For example, in an alternative embodiment a single module can be used to perform both geographic and statistical analyses. Or, in another alternative embodiment, functions described herein as being associated with post analysis module 35 can instead be implemented using social networking server 20. Thus other embodiments may have fewer or mode modules depending on the granularity of implementation. Numerous variations and alternative configurations will be apparent in light of this disclosure.

As illustrated in FIG. 3, in one embodiment a social network data aggregation method 100 commences with identifying social networking activity associated with a particular evaluated asset (110). This can be accomplished, for example, by using post analysis module 35 to analyze social network data transmitted from social network subscriber 10 to social networking server 20 and identify references to the marketer and/or brand of interest. The social networking activity being monitored may include, for example, postings made to public, semipublic and/or private forums; messages sent to one or more other members of the social network, such as Twitter tweets; "check-in" or other similar data indicating that a particular user is physically present at a particular location; and "like", "+1" or other similar data indicating that a particular user has clicked on a link corresponding to a positive disposition toward something that he/she experienced while using the social networking service. Other types of social networking data may be monitored in other embodiments. In certain embodiments marketing analysis server 30 can be configured to automatically retrieve social networking data for analysis from social networking server 20 periodically or continually, while in alternative embodiments social networking server 20 can be configured to automatically push social networking data to marketing analysis server 30 periodically or continually.

Once social networking activity associated with a particular marketer and/or brand is identified, a determination is made with respect to whether the identified activity contains location tag information (120). Where this is not the case, the identified social networking activity can be ignored and another instance of social networking activity can be detected and analyzed. However, where the identified social networking activity does include location tag information, such location information can be saved in a database associated with the particular marketer and/or brand under evaluation (140). It will be appreciated that in other embodiments it may be determined whether the identified activity includes additional or alternative tag information, such as temporal tag information. Temporal tag data can be used to analyze social networking activity before and after a marketing campaign is implemented. In embodiments where social networking activity including temporal tag data is detected, such temporal information can be saved in a database similar to that used to store location data. In certain embodiments social network data aggregation method 100 is performed by post analysis module 35.

The social networking data aggregated using method 100 can subsequently be used to evaluate the capacity of offline marketing assets to generate word-of-mouth. As illustrated in FIG. 4, in one embodiment an influence evaluation method 200 commences with receiving a user selection of an offline marketing asset which is to be evaluated (210). As described herein, method 200 can be used to evaluate a wide variety of tangible and non-tangible offline marketing assets, including for example, display advertisements, retail establishments, pamphlet distribution campaigns, television broadcast campaigns and radio broadcast campaigns. In certain embodiments, more than one offline marketing asset can be evaluated simultaneously. Selection of the one or more offline marketing assets can be performed by user interface module 36. Once such selection has been made, a geographic target region corresponding to the identified offline marketing asset is identified (220), and a geographic control region having a similar characteristic as the geographic target region is also identified (240). The target and control regions can be identified using geographic analysis module 37, and may be defined based on one or more of a variety of different factors, including based on a user-supplied definition provided by user interface module 36 or based on location information extracted from offline marketing asset database 50. Geographic analysis module 37 is optionally configured to identify one or more characteristics of the target region corresponding to the offline marketing asset (230) and define the control region such that it has similar characteristics, but does not include the offline media asset under evaluation. In certain embodiments the similar characteristic is a similar demographic characteristic such as a similar population density, a similar social networking penetration index, or a similar median income. Other demographic factors can be used in other embodiments. Establishing the control region based on such demographic factors can be accomplished, for example, by leveraging the resources of a networked demographic database 60 containing geographically keyed demographic information.

It will be appreciated that use of demographic information to define the geographic control region is optional, and thus the box corresponding to this feature in FIG. 4 is illustrated in broken lines. Thus, in certain embodiments the control region is established by simply selecting a neighboring region which does not include the offline marketing asset under evaluation. For instance, where the geographic target region comprises a circle drawn at a 100-meter radius from the offline marketing asset, the geographic control region may comprise a ring-shaped region having an outer edge drawn at a 200-meter radius from the offline marketing asset, but excluding the inner circle comprising the geographic target region. It will also be appreciated that, in certain embodiments, the geographic control region may correspond directly to the geographic target region, but social networking activity is analyzed within this common region during different time periods, such as before and after a particular offline media asset is put in place or otherwise implemented.

Still referring to the example evaluation method 200 illustrated in FIG. 4, social networking activity in the geographic target region that is associated with the marketer and/or brand under evaluation is quantified (250). This quantification, referred to herein as $A_T$, may be provided in terms of an absolute number of social networking events occurring within a given time period that mention the marketer and/or brand under evaluation (for example, tweets per hour or messages transmitted per week). Likewise, social networking activity in the geographic control region that is associated with the evaluated asset can also be quantified (260). This quantification, referred to herein as $A_C$, may also be provided in terms of an number of mentions per unit time. Alternatively, the quantification of $A_T$ and $A_C$ may be provided in terms of the aforementioned mention rate—that is, in terms of a proportion of social networking events that mention the evaluated asset. Regardless of how such quantification is actually accomplished, it can be understood that the social networking events identified as mentioning the marketer and/or brand under evaluation can be divided into at least two categories: those that occur within the target region and those that occur within the control region. A log likelihood ratio test can be used to determine whether differences in $A_T$ and $A_C$ are due to random fluctuations (270). In certain embodiments quantifying $A_T$ and $A_C$, as well as performing the log likelihood ratio test is conducted by statistical analysis module 38.

Once $A_T$ and $A_C$ have been quantified a determination can be made with respect to whether $A_T$ exceeds $A_C$ (280). Differences between $A_T$ and $A_C$ that exceed a randomness threshold provide a measure of the capacity of the selected offline marketing asset to generate word-of-mouth (285). On the other hand, where there is no statistically significant difference between $A_T$ and $A_C$, then it can be inferred that the selected offline marketing asset lacks the capacity to generate word-of-mouth. Statistical analysis module 38 can also be configured to compare social networking activity occurring within the geographic target region with similar activity within the geographic control region. It will be appreciated that in alternative embodiments the comparisons made by statistical analysis module 38 can be based not on different geographical regions, but rather on different temporal periods corresponding before and after a particular offline marketing asset may have been invoked or implemented.

Referring still to FIG. 4, the example evaluation method 200 concludes with using user interface module 36 to display results of the offline marketing asset evaluation (290). The results of such evaluation can be provided in one or more of a variety of different formats. For example, in certain embodiments evaluation results can be presented in a tabular format, such as illustrated in Table A.

TABLE A

Example tabular format for output of offline marketing asset evaluation data.

| | Postings Mentioning Evaluated Brand | Total Postings | Mention Rate |
|---|---|---|---|
| Target Region | $M_T$ | $N_T$ | $M_T \div N_T \propto A_T$ |
| Control Region | $M_C$ | $N_C$ | $M_C \div N_C \propto A_C$ |

Table A illustrates the results of an example implementation wherein $N_T$ social networking postings were identified as having originated within a target region within a specified time period; $M_T$ of these postings mentioned the evaluated asset. The mention rate is therefore provided by the ratio $M_T \div N_T$, which can be understood as being proportional to a quantification of the relevant social networking activity $A_T$ occurring within the target region. Likewise, $N_C$ social networking postings were identified as having originated within a control region within a specified time period; $M_C$ of these postings mentioned the evaluated asset. The ratio $M_C \div N_C$ can be understood as being proportional to a quantification of the relevant social networking activity $A_C$ occurring within the control region.

Figure 5:
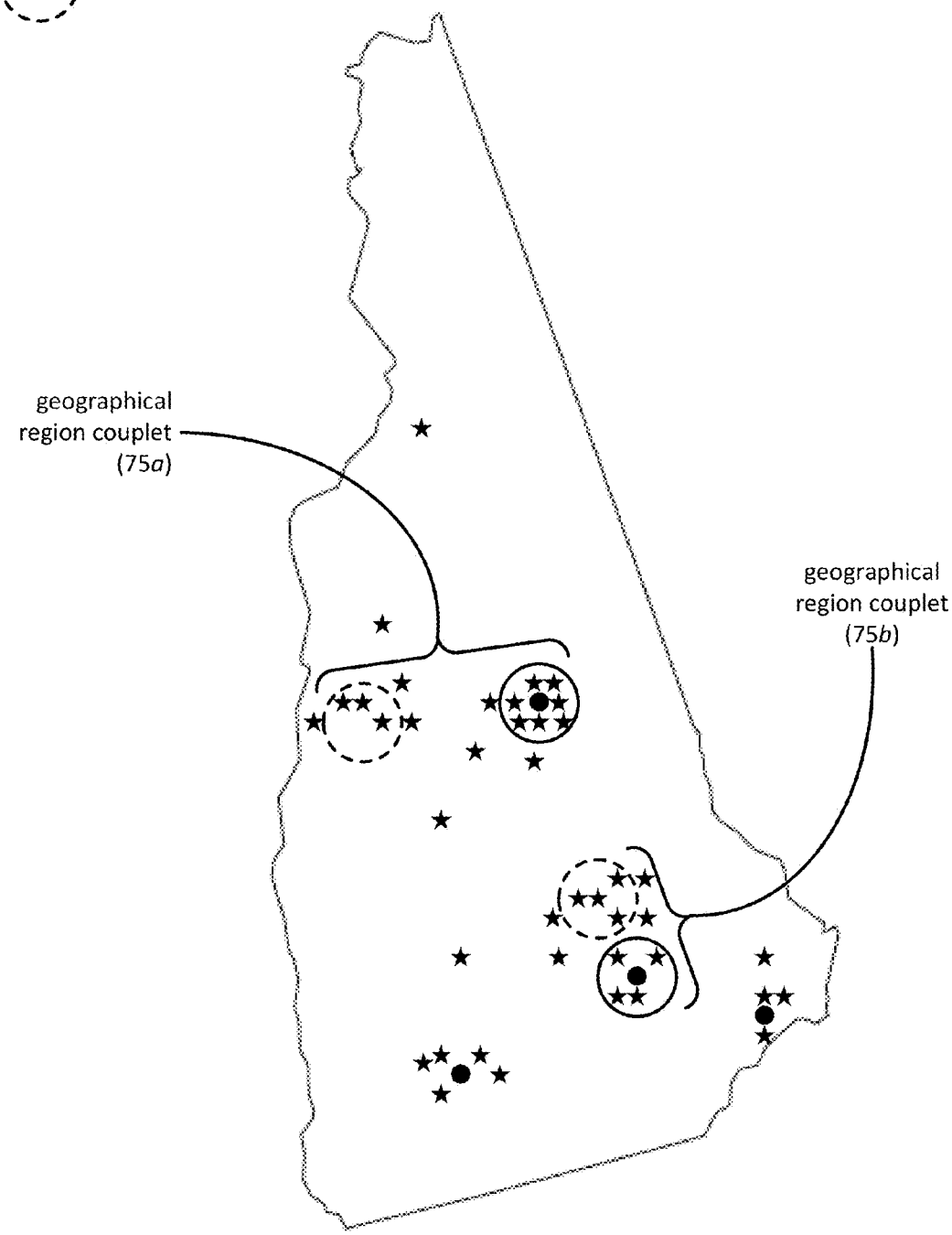
FIG. 5 is a map illustrating an example of how offline assets can be seen as influencing social networking activity in accordance with an embodiment of the present invention.

The evaluation results can additionally or alternatively be presented in a geographical format, such as by plotting the location of relevant social networking activity and corresponding offline marketing assets on a map; an example of such a geographical presentation format is provided in FIG. 5. In particular, FIG. 5 illustrates a map of New Hampshire in which a dot (●) indicates the location of an offline marketing asset 70 and a star (★) indicates the location of social networking activity 80. Examples of social networking activity include positing of a message to other members of the network, posting of a status update, or sending an indication of physical presence at a particular location (also referred to as "checking-in"). Also illustrated in FIG. 5 are solid-line circles indicating a geographic target region 70' corresponding to the offline marketing assets 70 and broken-line circles indicating a geographic control region 80'. In certain embodiments geographic control region 80' shares a similar characteristic with target region 70', such as a similar demographic characteristic, but does not include any offline marketing asset 70. The target and control regions 70', 80', when taken together form geographical region couplets 75a, 75b; the two regions comprising the couplet can be compared using the methodologies disclosed herein.

The map provided in FIG. 5 illustrates the relative capacity of the offline marketing assets 70 to influence word-of-mouth as measured by social networking activity. For example, couplet 75a comprises a geographic target region 70' in which a relatively large amount of social networking activity has occurred, particularly as compared to the geographic control region 80' forming the other half of couplet 75a. This suggests that the offline marketing asset within the target region 70' has a relatively strong capacity to generate word-of-mouth. In contrast, couplet 75b comprises target and control regions 70', 80' in which substantially similar amounts of social networking activity has occurred. This suggests that the offline marketing asset within the target region 70' does not generate substantial word-of-mouth. FIG. 5 illustrates an example embodiment in which target and control regions are defined on a relatively large scale; it will be appreciated that in other embodiments such regions can be defined with a significantly higher degree of specificity, such as within a particular shopping mall, or even within a particular sector of a shopping mall.

CONCLUSION

Numerous variations and configurations will be apparent in light of this disclosure. For instance, one example embodiment of the present invention provides a system comprising a post analysis module configured to identify a plurality of social networking events, each of which includes (a) reference to an evaluated entity and (b) data specifying a geographical location associated with the social networking event. The system further comprises a geographic analysis module configured to define a target region encompassing an offline marketing asset and a control region that does not encompass the offline marketing asset. The system further comprises a statistical analysis module configured to allocate the plurality of social networking events to either the target region or the control region. The allocation is based on the geographical location associated with each allocated social networking event. The system further comprises a user interface module configured to display, on a display screen, a comparison of the social networking events allocated to the target region with the social networking events allocation to the control region. In some cases the offline marketing asset is associated with the evaluated entity. In some cases (a) the target region is a circle having a radius $r_1$ around the offline marketing asset; and (b) the control region is a ring-shaped region having a radius $r_2$ around the offline marketing asset but excluding the target region. In some cases the offline marketing asset is selected from a group consisting of a retail establishment and an outdoor advertising asset. In some cases the system further comprises a marketing analysis server having a processor and a memory, wherein the post analysis module is further configured to store, in the memory, the data specifying the geographical location for each identified social networking event. In some cases each of the social networking events comprises a text message generated using Twitter. In some cases the statistical analysis module is further configured to (a) compare a target quantity of social networking events allocated to the target region with a control quantity of social networking events allocated to the control region; and (b) apply a log likelihood ratio test to determine a likelihood that a difference between the target and control quantities results from random fluctuations. In some cases (a) the statistical analysis module is further configured to compare a target quantity of social networking events allocated to the target region with a control quantity of social networking events allocated to the control region; and (b) the target and control quantities are expressed in terms of a mention rate. In some cases the statistical analysis module is further configured to (a) compare a target quantity of social networking events allocated to the target region with a control quantity of social networking events allocated to the control region; and (b) apply test of proportion to determine a likelihood that a difference between the target and control quantities results from random fluctuations.

Another example embodiment of the present invention provides a computer program product encoded with instructions that, when executed by one or more processors, causes a process to be carried out. The process comprises analyzing an interaction between a social networking server and a social network subscriber. Where the interaction (a) mentions an evaluated entity and (b) includes location data corresponding to a geographical location associated with the interaction, the process further comprises allocating the geographical location to either a target region or a control region. The target region encompasses an offline asset associated with the evaluated entity. The process further comprises displaying a comparison of the target region and the control region. The comparison is expressed in terms of a mention rate. In some cases the mention rate corresponds to a ratio of a quantity of interactions processed by the social networking server that mention the evaluated entity to a total quantity of interactions processed by the social networking server. In some cases the evaluated entity comprises an entity selected from a group consisting of a marketer and a brand. In some cases the evaluated entity comprises a plurality of marketers and a plurality of brands. In some cases the evaluated entity comprises a brand and the offline asset comprises a retail establishment marketing the brand. In some cases the process further comprises analyzing a plurality of interactions between the social networking server and a corresponding plurality of social network subscribers. In some cases the interaction comprises a check-in event indicating that the social network subscriber is physically present at the geographical location. In some cases displaying the comparison further comprises generating a map on a display screen. In some cases the control region does not encompass the offline asset.

Another example embodiment of the present invention comprises a computer-implemented method comprising identifying a plurality of interactions between a social networking server and a plurality of social network subscribers, wherein each of the interactions includes reference to an evaluated entity and location data. The method further comprises defining a target region that encompasses an offline asset associated with the evaluated entity. A first subset of the plurality of interactions includes location data specifying points within the target region. The method further comprises defining a control region that does not encompass the offline asset. A second subset of the plurality of interactions includes reference to specifying points within the control region. The method further comprises displaying a comparison of the first and second subsets of the plurality of interactions. In some cases (a) the comparison is displayed on a display screen, and includes a mention rate for the target and control regions; and (b) the mention rate corresponds to a ratio of a quantity of interactions processed by the social networking server that mention the evaluated entity to a total quantity of interactions processed by the social networking server. In some cases wherein defining the control region further comprises (a) identifying a characteristic of the target region; and (b) defining the control region such that the control region shares the identified characteristic of the target region. In some cases defining the control region further comprises (a) identifying a demographic characteristic of the target region; and (b) defining the control region such that the control region shares the identified demographic characteristic of the target region, wherein defining the control region further comprises receiving demographic data from a networked demographic database.

The foregoing description of the embodiments of the present invention has been presented for the purposes of illustration and description. It is not intended to be exhaustive or to limit the invention to the particular disclosed embodiments. Many modifications and variations are possible in light of this disclosure. Thus, it is intended that the scope of the invention be limited not by this detailed description, but rather by the claims appended hereto.

What is claimed is:

1. A system comprising:
   a user interface module configured to receive a user selection of an offline marketing asset that is associated with an evaluated entity;
   a post analysis module configured to identify a plurality of digital interactions between a social networking server and a plurality of social network subscribers, wherein each of the identified digital interactions includes reference to the evaluated entity and location data that defines a particular location of a particular social network subscriber when a particular digital interaction occurred;
   a geographic analysis module configured to define a target region encompassing the offline marketing asset and a control region that includes neither the offline marketing asset nor the target region;
   a communication module configured to receive social networking data originating from the social networking server that characterizes the plurality of digital interactions, and to receive demographic data from a networked demographic database, wherein the demographic data defines a demographic characteristic of the target region;
   a statistical analysis module configured to
      identify a first subset of the plurality of digital interactions, each of which includes location data specifying a location within the target region, and wherein social networking activity within the target region is quantified by a parameter $A_T$,
      identify a second subset of the plurality of digital interactions, each of which includes location data specifying a location within the control region, and wherein social networking activity within the control region is quantified by a parameter $A_C$, and apply a test of proportion to determine a likelihood that a difference between $A_T$ and $A_C$ results from random fluctuations as compared to word-of-mouth generated by the offline marketing asset; and a user interface module configured to display, on a display screen, a comparison of $A_T$ and $A_C$, wherein $A_T$ and $A_C$ are each expressed in terms of a value selected from a group consisting of (a) a ratio of a quantity of identified digital interactions within a particular region that mention the evaluated entity to a total quantity of identified digital interactions in the particular region, and (b) an absolute quantity of identified digital interactions occurring in the particular region during a particular timeframe.

2. The system of claim 1, wherein:

the target region is a circle having a radius $r_1$ around the offline marketing asset; and the control region is a ring-shaped region having a radius $r_2$ around the offline marketing asset but excluding the target region.

3. The system of claim 1, wherein the offline marketing asset is selected from a group consisting of a retail establishment and an outdoor advertising asset.

4. The system of claim 1, further comprising a marketing analysis server having a processor and a memory, wherein the post analysis module is further configured to store, in the memory, the location data that defines the particular location for each identified digital interaction.

5. The system of claim 1, wherein the statistical analysis module is further configured to apply a log likelihood ratio test to determine the likelihood that the difference between $A_T$ and $A_C$ results from random fluctuations.

6. The system of claim 1, wherein at least a portion of the identified digital interactions comprise a text message generated using Twitter.

7. A computer program product encoded with instructions that, when executed by one or more processors, causes a process to be carried out, the process comprising:

identifying a plurality of digital interactions between a social networking server and a plurality of social network subscribers, wherein each of the digital interactions mentions an evaluated entity and includes location data that defines a particular location of a particular social network subscriber when a particular digital interaction occurred;

receiving social networking data originating from the social networking server that characterizes the plurality of digital interactions;

defining a target region that encompasses an offline asset associated with the evaluated entity;

receiving demographic data from a networked demographic database, wherein the demographic data defines a demographic characteristic of the target region;

defining a control region that includes neither the offline asset nor the target region, wherein the control region shares the demographic characteristic of the target region;

identifying a first subset of the plurality of digital interactions, wherein each digital interaction in the first subset includes location data specifying a location within the target region, and wherein social networking activity within the target region is quantified by a parameter $A_T$;

identifying a second subset of the plurality of digital interactions, wherein each digital interaction in the second subset includes location data specifying a location within the control region, and wherein social networking activity within the control region is quantified by a parameter $A_C$;

applying a test of proportion to determine a likelihood that a difference between $A_T$ and $A_C$ results from random fluctuations as compared to word-of-mouth generated by the offline asset; and displaying the likelihood and a comparison of $A_T$ and $A_C$, wherein $A_T$ and $A_C$ are each expressed in terms of a value selected from a group consisting of (a) a ratio of a quantity of identified digital interactions within a particular region that mention the evaluated entity to a total quantity of identified digital interactions in the particular region, and (b) an absolute quantity of identified digital interactions occurring in the particular region during a particular timeframe.

8. The computer program product of claim 7, wherein the evaluated entity comprises an entity selected from a group consisting of a marketer and a brand.

9. The computer program product of claim 7, wherein the evaluated entity comprises a brand and the offline asset comprises a retail establishment marketing the brand.

10. The computer program product of claim 7, wherein at least a portion of the digital interactions comprise a check-in event indicating that one of the social network subscribers is physically present in either the control region or the target region.

11. The computer program product of claim 7, wherein displaying the comparison further comprises generating a map on a display screen.

12. The computer program product of claim 7, wherein displaying the comparison further comprises:

generating a map on a display screen;

displaying perimeters for the target and control regions on the map; and pinpointing, on the map, locations associated with digital interactions in the first and second subsets.

13. The computer program product of claim 7, wherein the evaluated entity comprises a plurality of marketers and a plurality of brands.

14. The computer program product of claim 7, wherein:

the target region has a substantially circular shape with radius $r_1$; and the control region surrounds the target region and has a substantially annular shape with radius $r_2$.

15. A computer-implemented method comprising:

identifying a plurality of digital interactions between a social networking server and a plurality of social network subscribers, wherein each of the identified digital interactions includes reference to an evaluated entity and location data that defines a particular location of a particular social network subscriber when a particular digital interaction occurred;

receiving social networking data originating from the social networking server that characterizes the plurality of digital interactions;

defining a target region that encompasses an offline asset associated with the evaluated entity;

receiving demographic data from a networked demographic database, wherein the demographic data defines a demographic characteristic of the target region;

identifying a first subset of the plurality of digital interactions, each of which includes location data specifying a location within the target region, wherein social networking activity within the target region is quantified by a parameter $A_T$;

defining a control region that includes neither the offline asset nor the target region, wherein the control region shares the demographic characteristic of the target region;

identifying a second subset of the plurality of digital interactions, each of which includes location data specifying a location within the control region, wherein social networking activity within the control region is quantified by a parameter $A_C$;

applying a test of proportion to determine a likelihood that a difference between $A_T$ and $A_C$ results from random fluctuations as compared to word-of-mouth generated by the offline asset; and displaying the likelihood and a comparison of $A_T$ and $A_C$, wherein $A_T$ and $A_C$ are each expressed in terms of a value selected from a group consisting of (a) a ratio of a quantity of identified digital interactions within a particular region that mention the evaluated entity to a total quantity of identified digital interactions in the particular region, and (b) an absolute quantity of digital interactions occurring in the particular region during a particular timeframe.

16. The method of claim 15, wherein:

the target region is a substantially circular region of radius $r_1$ that is positioned around the offline asset; and the control region is a substantially annular region of radius $r_2 > r_1$ that is positioned around the target region and that excludes the target region.

17. The method of claim 15, wherein the test of proportion is a log likelihood ratio test.

* * * * *